(12) United States Patent
Hupton et al.

(10) Patent No.: US 8,676,393 B1
(45) Date of Patent: Mar. 18, 2014

(54) POWER DISCOVERY AND ALLOCATION WITHIN A POWER SHARING GROUP

(75) Inventors: John R. Hupton, San Jose, CA (US);
Ali Ahmad Tareen, Milpitas, CA (US);
Minli Lln, Saratoga, CA (US); Krishna Kumar Vavilala, Cedar Park, TX (US);
Johnston Reid McGaughey, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 13/048,475

(22) Filed: Mar. 15, 2011

(51) Int. Cl.
| | |
|---|---|
| *G05D 3/12* | (2006.01) |
| *H02J 1/10* | (2006.01) |
| *H02J 3/14* | (2006.01) |
| *G06Q 50/06* | (2012.01) |
| *G05F 1/585* | (2006.01) |

(52) U.S. Cl.
CPC . *H02J 3/14* (2013.01); *G06Q 50/06* (2013.01); *G05F 1/585* (2013.01)
USPC .............. 700/295; 700/291; 700/296; 307/24

(58) Field of Classification Search
None
See application file for complete search history.

(56) References Cited

U.S. PATENT DOCUMENTS

| | | | | |
|---|---|---|---|---|
| 5,572,438 A | * | 11/1996 | Ehlers et al. | 700/295 |
| 5,684,710 A | * | 11/1997 | Ehlers et al. | 700/293 |
| 5,696,695 A | * | 12/1997 | Ehlers et al. | 700/286 |
| 6,512,966 B2 | * | 1/2003 | Lof et al. | 700/291 |
| 6,671,585 B2 | * | 12/2003 | Lof et al. | 705/36 R |
| 6,934,137 B2 | * | 8/2005 | Elliott et al. | 361/62 |
| 7,369,950 B2 | * | 5/2008 | Wall et al. | 702/60 |
| 7,430,534 B2 | * | 9/2008 | Lof et al. | 705/37 |
| 7,467,311 B2 | * | 12/2008 | Bahali et al. | 713/320 |
| 7,664,968 B2 | * | 2/2010 | Bahali et al. | 713/300 |
| 7,873,441 B2 | * | 1/2011 | Synesiou et al. | 700/286 |
| 8,310,089 B2 | * | 11/2012 | Schindler et al. | 307/24 |
| 8,369,271 B2 | * | 2/2013 | Borst et al. | 370/329 |
| 8,397,088 B1 | * | 3/2013 | Ghose | 713/300 |
| 2001/0010032 A1 | * | 7/2001 | Ehlers et al. | 702/62 |
| 2002/0084655 A1 | * | 7/2002 | Lof et al. | 290/44 |
| 2002/0087234 A1 | * | 7/2002 | Lof et al. | 700/286 |
| 2002/0103745 A1 | * | 8/2002 | Lof et al. | 705/37 |
| 2002/0194113 A1 | * | 12/2002 | Lof et al. | 705/37 |
| 2003/0006613 A1 | * | 1/2003 | Lof et al. | 290/44 |
| 2003/0126060 A1 | * | 7/2003 | Lof et al. | 705/36 |
| 2005/0127680 A1 | * | 6/2005 | Lof et al. | 290/44 |

(Continued)

OTHER PUBLICATIONS

ABB, "Relion® 630 Series, Load Shedding Controller PML630", 2011, ABB Corporation, Retrieved from the Internet at "www.abb.com/substationautomation".*

(Continued)

*Primary Examiner* — Mohammad Ali
*Assistant Examiner* — Kelvin Booker
(74) *Attorney, Agent, or Firm* — Tucker Ellis LLP

(57) ABSTRACT

Disclosed in an example embodiment herein is a technique for performing discovery and power budgeting for a power sharing group comprising a plurality of power supply modules configured for sharing power. Data is collected to determine members of the power sharing group, input power and load power for members of the power sharing group. A power budget is determined for members of the power sharing group and the power budget is distributed to members of the power sharing group. Load shedding inputs are calculated in the event that load power exceeds the capacity of the power sharing group.

20 Claims, 6 Drawing Sheets

(56) References Cited

U.S. PATENT DOCUMENTS

| | | | |
|---|---|---|---|
| 2006/0239224 A1* | 10/2006 | Borst et al. | 370/329 |
| 2006/0282685 A1* | 12/2006 | Bahali et al. | 713/300 |
| 2006/0282686 A1* | 12/2006 | Bahali et al. | 713/300 |
| 2007/0168151 A1* | 7/2007 | Kernahan et al. | 702/132 |
| 2008/0172312 A1* | 7/2008 | Synesiou et al. | 705/34 |
| 2010/0284117 A1 | 11/2010 | Crane | |
| 2011/0184579 A1* | 7/2011 | Nilsen et al. | 700/295 |
| 2011/0266867 A1* | 11/2011 | Schindler et al. | 307/24 |
| 2012/0092811 A1* | 4/2012 | Chapel et al. | 361/622 |
| 2013/0031378 A1* | 1/2013 | Schindler et al. | 713/300 |

OTHER PUBLICATIONS

ABB, "Relion® 630 Series, Load Shedding Controller PML630 Product Guide", 2011, ABB Corporation, Retrieved from the Internet at "www.abb.com/substationautomation".*

GE Digital Energy, "Protection and Control Journal", Oct. 2008, ISSN 1718-3189, Retrieved from the Internet at "www.GEMultilin.com".*

Bevrani, H.; Tikdari, A.G. and Hiyama, T., "Power System Load Shedding: Key Issues and New Perspectives", 2010, World Academy of Science, Engineering and Technology, No. 41.*

Cisco, "Catalyst 3750-X and 3560-X Switch, Software Configuration Guide", May 2010, Cisco IOS Release 12.2(53)SE2.*

Kucuk, S. and Refinery, I., "The Load Control of One Local Power Station Connected to the National Grid", 1999, International Conference on Electrical and Electronics Engineering (ELECO'99), E01. 90/C-17.*

New 'Borderless Access' Solutions Emphasize Pricing Flexibility, Sustainability, Video and Security Capabilities to Enable Organizations to Adopt Flexible Business Models and Expand Geographical Reach; 1992-2011 Cisco Systems Inc.

* cited by examiner

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Major Version 702 ||||||||Minor Version 704 |||||||| Message Type 706 ||||||||
| PS1 708 | PS2 710 | S 712 | J 714 | N 716 | M 718 | C 720 ||E 722 | R. 724 | Res. 726 | Res 726 | Res 726 | Res. 726 | Res 726 | Res. 726 |
| Length 728 |||||||| Sequence Number 730 ||||||||
| Source Mac Address 732 ||||||||||||||||
| Source Mac Address (Continued) ||||||||||||||||
| Source Mac Address (Continued) ||||||||||||||||
| Destination Mac Address 734 ||||||||||||||||
| Destination Mac Address (Continued) ||||||||||||||||
| Destination Mac Address (Continued) ||||||||||||||||
| PS1 Power Capacity 736 |||||||| PS2 Power Capacity 738 ||||||||
| Payload 740 |||||||| Payload ||||||||
| Checksum ||||||||||||||||

FIG. 7

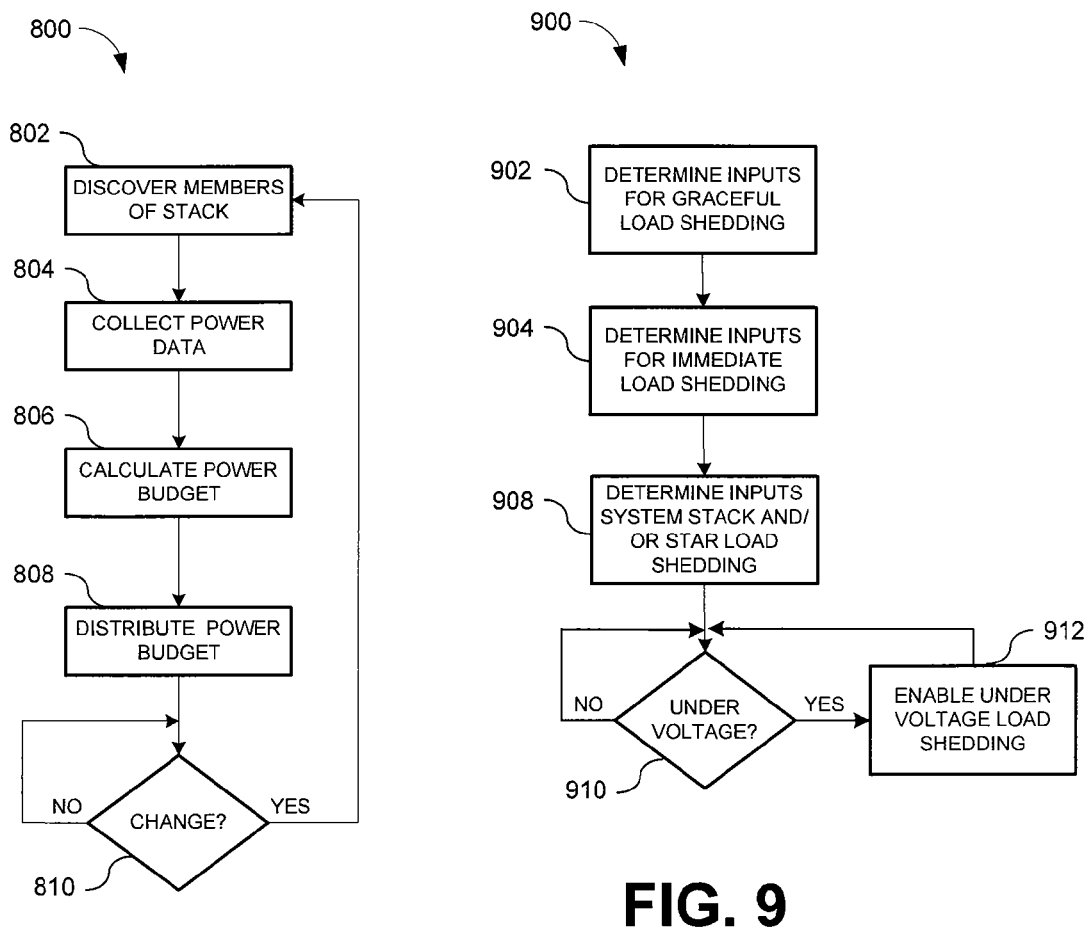

POWER DISCOVERY AND ALLOCATION WITHIN A POWER SHARING GROUP

TECHNICAL FIELD

The present disclosure relates generally to power supplies capable of being configured to share power.

BACKGROUND

A power sharing group enables load sharing of Front End Power ("FEP") supplies across multiple systems. A power sharing group could be visualized as power supplies from individual switches joining together to form one larger power supply that supplies power to the individual switches and the powered devices ("PDs") connected to them.

For example, in standalone switches that provide Power over Ethernet ("PoE" or "POE"), the power budget available for distribution to the PoE devices is based on the capacity of the power supply (or supplies) present in the switch. If a supply is removed or fails, the power budget is adjusted to the remaining capacity of the remaining power supply; however, a switch with a power supply module may receive power from other power supply modules belonging to the power sharing group to compensate for any loss or failure of an internal power supply.

BRIEF DESCRIPTION OF THE DRAWINGS

The accompanying drawings incorporated herein and forming a part of the specification illustrate the example embodiments.

FIG. 7 illustrates an example of a packet format for exchanging data between switches.

FIG. 8 illustrates an example of a methodology for power budgeting.

FIG. 9 illustrates an example of a methodology for providing inputs to a load shed algorithm and re-balancing a power budget.

OVERVIEW OF EXAMPLE EMBODIMENTS

Figure 1:
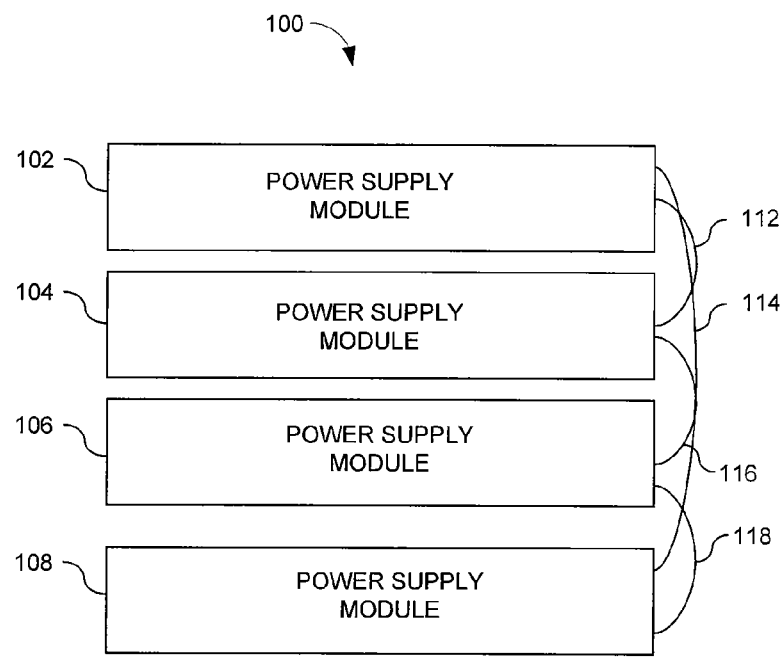
FIG. 1 is a block diagram illustrating an example of a power sharing group where the power supply modules are coupled in a ring configuration.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface for communicating with at least one other power supply module, and a controller coupled with the interface. The controller is operable to determine members of a power sharing group through messages received from the interface. The controller collects data representative of capacity and load for members of the power sharing group. The controller determines a power budget for members of the power sharing group based on the data representative of input power and load power for members of the power sharing group. The controller is distributes the power budget to members of the power sharing group via the interface.

In accordance with an example embodiment, there is disclosed herein a method that comprises determining members of a power sharing group. Data representative of input power and load power is obtained for members of the power sharing group. A controller determines a power budget for members of the power sharing group based on the data representative of input power and load power. The power budget is distributed to members of the power sharing group.

In accordance with an example embodiment, there is disclosed herein logic encoded in a non-transitory computer readable storage medium for execution by a processor, and when executed operable to determine members of a power sharing group, obtain data representative of input power and load power for members of the power sharing group, and determine a power budget for members of the power sharing group based on the data representative of input power and load power for members of the power sharing group. The logic when executed is further operable to distribute the power budget to members of the power sharing group.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Disclosed in an example embodiment herein is a power sharing system with the ability to automatically shift power allocations between member power supply modules based on usage, as well as distribute and re-distribute power budgets during power events (such as losses of input power or increases in load power) based on inputs including: current aggregate input power, current aggregate output load power, the member power supply locations and user-assigned priorities of output loads, and the known power requirements of the member switches.

Three features of group power sharing budgeting include:

(1) Distributing initial power budgets to the set of power supply modules in the power sharing based on the total aggregate input power available, the power requirements of the switches, and the user-assigned priorities of the switch loads.

(2) Re-distributing power budgets after the loss or gain of input power, based on the same set of inputs as above, and additionally based on the current aggregate output loads, the magnitudes of those loads and their locations, and the priorities of the PoE loads. The primary goal of the re-distribution is to maximize use of the input power so as to limit load-shedding (e.g., "power denied") to only those lowest-priority loads (PDs and switches) when there is not enough power after other higher priority loads have received the budgets necessary to guarantee their operation.

(3) Dynamic load-balancing of otherwise stable power budgets. If switch X is not using its full allocation of power budget, but switch Y is using all (or most) of its power budget allocation, then power budget will be automatically shifted from switch X to switch Y and switch Y begins providing more power to more powered devices ("PDs"). In this way, even without adding more or larger power supplies on switch Y or anywhere in the power sharing group, switch Y is able to increase its power budget and accommodate more PDs on-the-fly, effectively balancing the budgets and loads throughout the power sharing group's power domain.

In an example embodiment, there is described herein a methodology for providing inputs to a load shedding algorithm. Load shedding generally refers to the purposeful disconnection of loads from the power distribution system (power sharing group) to avoid a sustained system-wide overload condition. The overload condition may arise when there is an increase in load that is beyond the capacity of the power sharing group, or upon a reduction in capacity, for example a power supply module fails or a power supply module is removed from the power sharing group.

There are different types of load shedding, such as 1) graceful load shedding, 2) immediate load shedding, 3) system ring load shedding, 4) system star load shedding, and 5) under voltage load shedding. Each type of load shedding has different settings and monitoring. In an example embodiment, software may use data provided by the power supply modules to compute and set appropriate hardware bits to implement load shedding. In an example embodiment, there are three types of loads, high priority (for example high priority PoE devices); low priority (for example low priority PoE devices; and system (such as power to operate switches that are providing PoE).

Referring to FIG. 1, there is a block diagram illustrating an example of a power sharing group 100 comprising power supply modules 102, 104, 106, 108 coupled in a ring configuration 100. In this example, power supply modules 102, 104, 106, 108 have two power sharing interfaces. Power supply module 102 is coupled with power supply module 104 via power sharing cable 112 and with power supply module 108 via power sharing cable 114. Power supply module 104 is coupled with power supply module 102 via power sharing cable 112 and is coupled with power supply module 106 via power sharing cable 116. Power supply module 106 is coupled with power supply module 104 via power sharing cable 114 and coupled with power supply module 108 via power sharing cable 118. In a half-ring configuration, one of power power sharing cables 112, 114, 116, 118 would not be present. Power power sharing cables 112, 114, 116, 118 are employed to share power between power supply modules in the power sharing group. As will be described herein infra (see for example FIGS. 3-5), power supply modules 102, 104, 106, 108 can employ controllable switching devices coupled with an interface (referred to herein as a power sharing interface) coupled with power power sharing cables 112, 114, 116, 118. When the controllable switching devices are closed, power is shared among power supply modules 102, 104, 106, 108; however, when the switches are open, power is not shared between power supply modules. Any power supply modules that do not have an internal power supply may receive sufficient power bleeding from another interface (e.g., a data interface that provides enough bleeding power allowing a power supply module to communicate with other members of the power sharing group) that enables the power supply module to function (for example for sending and/or receiving discovery messages) until a controllable switching device is closed and power is received via the power sharing interface.

Figure 3:
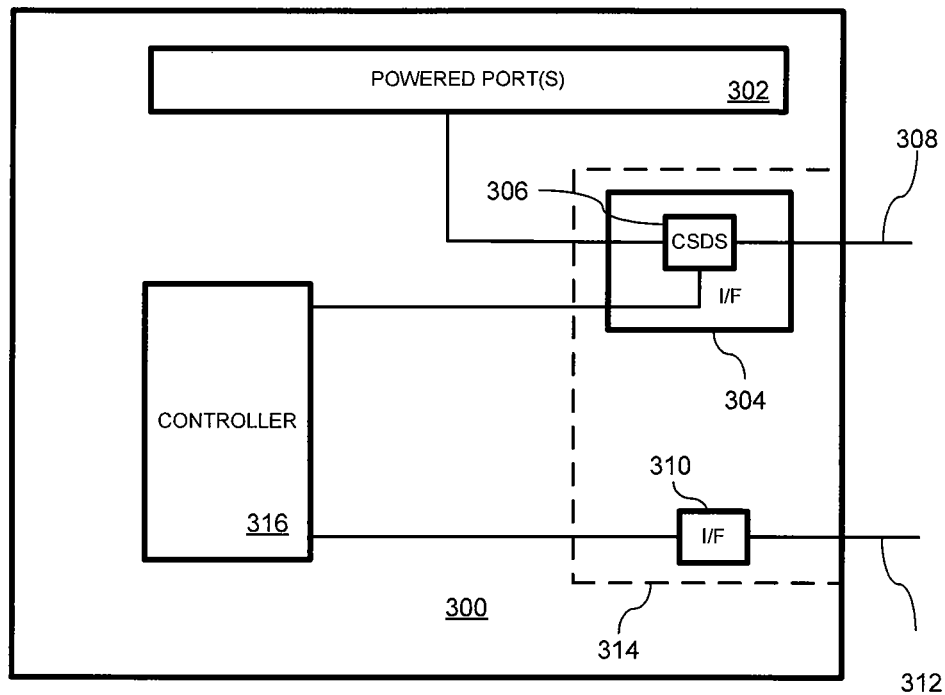
FIG. 3 is a block diagram illustrating an example of a power supply module capable of being coupled with at least one additional power supply module.
Figure 5:
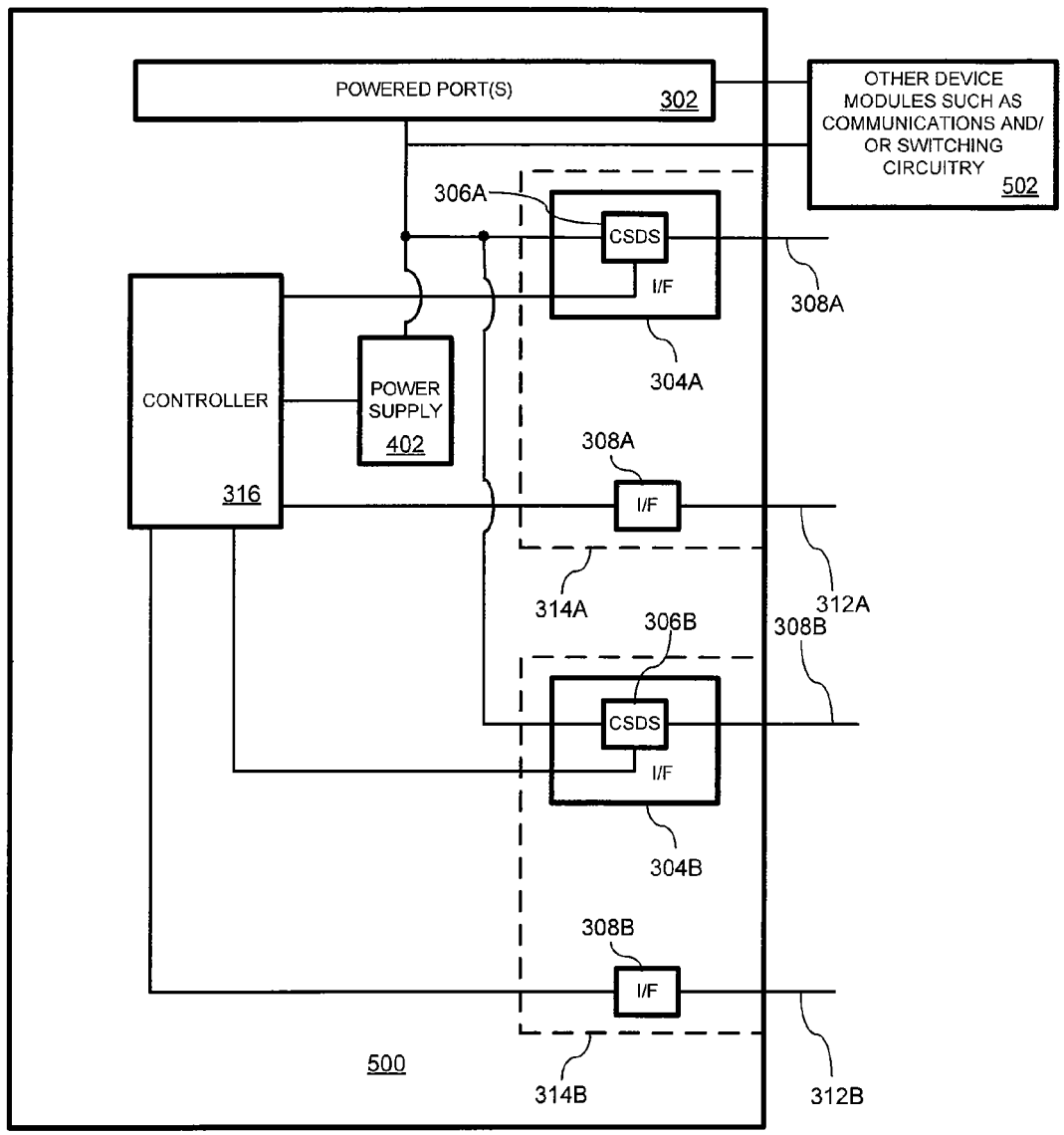
FIG. 5 is a block diagram illustrating an example of a power supply module with an internal power supply and two power sharing interfaces.

In an example embodiment, at least one of power supply modules 102, 104, 106, 108 has an internal power supply (for example as illustrated in FIGS. 3 and 5). For example, if only power supply module 102 has an internal power supply, it would share (provide) power with modules 104, 106, 108 via power power sharing cables 112, 114, 116, 118. In particular embodiments, if more than one of power supply modules 102, 102, 106, 108 has an internal power supply, some power supplies may be turned off when not needed (redundant mode). For example, if power supply modules 102, 104, 106, and 108 all have internal power supplies, but only two power supplies are required to provide power, some or all of the internal power supplies of power supply modules 102, 104, 106, 108 and any powered (e.g., POE or POE+) devices coupled with power supply modules 102, 104, 106, 108, then any two of the internal power supplies of power supply modules 102, 104, 106, 108 may share power with power supply modules 102, 104, 106, 108 via power sharing cables 112, 114, 116, 118 while the other two power supply modules turn off their internal power supplies. For example, power supply modules 102 and 104 may provide (share) power to all of power supply modules 102, 104, 106, 108, and the internal power supplies for power supply modules, so the internal power supplies of power supply modules 106, 108 may be switched off.

If additional power is needed because of the addition of powered devices to any of power supply modules 102, 104, 106, 108, then one or both of the switched off internal power supplies (e.g., the internal power supplies of power supply modules 106, 108 in the preceding example) may be switched on as needed.

Similarly, if less power is required due to less consumption by powered devices (for example in the evening when powered devices may be turned off), then power supplies may be switched off as needed. For example, in the preceding example power supply modules 102, 104 were sharing (providing) power for the rest of the group. If less power (only one power supply) is required, then one of the internal power supplies of power supply modules 102, 104 can be switched off.

Although the example illustrated in FIG. 1 shows four power supply modules 102, 104, 106, 108, those skilled in the art should readily appreciate that any physically realizable number of power supply modules (e.g., two or more) may be employed to create a power sharing group. Moreover, in accordance with an example embodiment, the internal power supplies of the power supply modules can have different capacities. Note that the removal any one of power sharing cables 112, 114, 116, 118 would change the configuration to a half-ring configuration where the end points (the power supply modules with only one power sharing cable attached) would have one power sharing connection.

Figure 2:
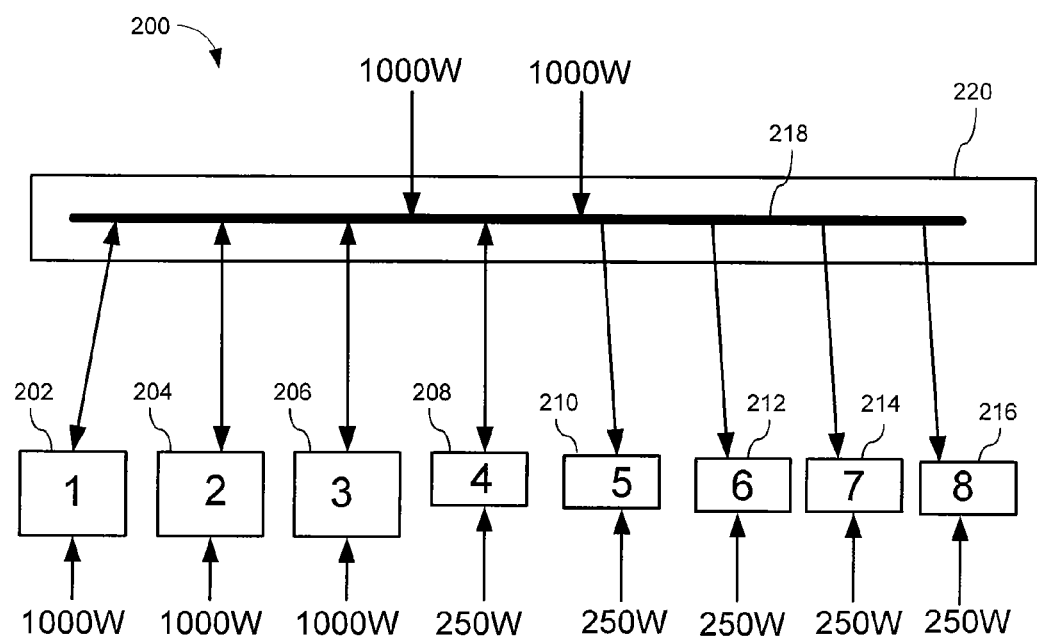
FIG. 2 is a block diagram illustrating an example of a power sharing group employing an expandable power supply where the power supply modules are coupled in a star configuration.

FIG. 2 is a block diagram illustrating an example of an expandable power supply ("XPS") 220 comprising power supply modules 202, 204, 206, 208, 210, 212, 214, 216 ("202-216") coupled in a star configuration. In this configuration, one power sharing output from power supply modules 202-216 is coupled with a common bus 218 for sharing power. XPS 220 may suitably comprise a computer system (not shown, see e.g., computer system 600 in FIG. 6) having logic for performing the functionality described herein. In an alternate embodiment, one of power supply modules 202-216 may function as the master of the group.

Referring to FIG. 3, there is illustrated a simple block diagram of a power supply module 300 capable of being coupled with at least one additional power supply module (not shown, see e.g., FIG. 1 or 2) for power sharing. In an example embodiment, power supply module 300 is part of a switch that is capable of providing power via Power over Ethernet ("POE" or "PoE") and/or Power over Ethernet Plus ("PoE+") to powered devices (not shown).

Power supply module 300 comprises at least one powered port 302 that provide power to powered devices. In an example embodiment, the at least one powered port 302 is capable of providing power via Power over Ethernet ("POE" or "PoE") and/or Power over Ethernet Plus ("PoE+"). Power sharing interface 304 is provided to share power with at least one additional power supply. Power sharing interface 304 may suitably comprise controllable switching device 306 such as a current sensing disconnect switch ("CSDS"). In particular embodiments, CSDS 306 is a bidirectional current sensing disconnect switch ("BCSDS"). A field effect transistor (FET) may be employed to implement controllable switching device 306. A connector 308 is employed to couple interface 304 to at least one additional power supply module. When controllable switching device 306 is open, connector 308 is isolated from the at least one powered port 302. When controllable switching device 306 is closed, connector 308 is coupled with at least one powered port 302 and power from other power supply modules can be shared and employed to provide power to the at least one powered port 302.

A data interface 310 is employed to communicate with at least one other power supply module that is capable of sharing power with power supply module 300 via a connection 312. Data interface 310 can be employed to send and receive discovery messages, master declaration messages and/or power budget messages as described herein.

In an example embodiment, power sharing interface 304 and data interface 310 are part of a communication interface 314. In particular embodiments, a Universal Asynchronous Receiver/Transmitter ("UART") may be employed to implement communication interface 314 that comprises power sharing interface 304 and data sharing interface 310. For example the power sharing and communication interfaces may be provided on different pins. In an example embodiment, data interface 310 may be implemented on the UART's software communication bus.

Controller 316 controls the operation of power supply module 300. In an example embodiment, a micro controller unit (MCU) is employed for implementing controller 316. Controller 316 suitably comprises logic for performing the functionality described herein.

In the example illustrated in FIG. 3, power supply module 300 does not have an internal power supply. Power supply module 300 may receive residual power via connection 312 from other power supply modules belonging to the group. Controller 316 can open and close controllable switching device (CSDS) 306 to selectively provide power to the at least one powered port 302.

Figure 4:
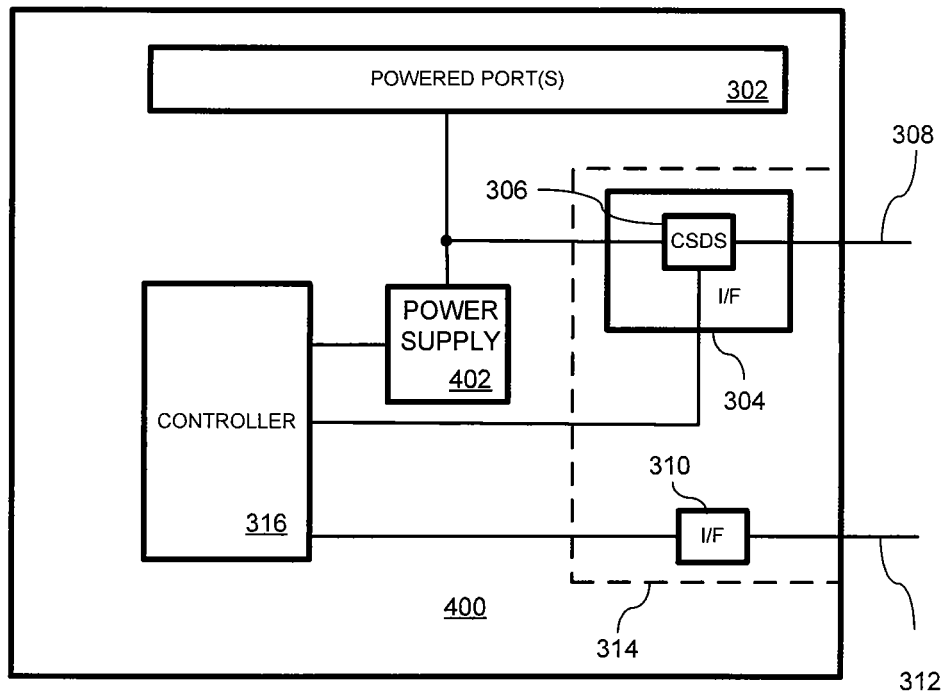
FIG. 4 illustrates a block diagram illustrating an example of a power supply module with an internal power supply and a single power sharing interface.

In an example embodiment, a power supply module may suitably comprise an internal power supply. FIG. 4 illustrates an example of a power supply module 400 with an internal power supply. Although a single power supply 402 is illustrated, those skilled in the art should appreciate that this is merely for ease of illustration as a power supply module may suitably comprise a multiplicity of internal power supply modules, up to any physically realizable number of internal power supplies. When controllable switching device (CSDS) 306 is closed, power from internal power supply 402 is shared other power supply modules (not shown, see e.g., FIGS. 1 and 2) for providing power to any powered devices coupled to at least one powered port 302 as well as any powered devices coupled with the other power supply modules.

FIG. 5 is a block diagram illustrating an example of a power supply module 500 comprising an internal power supply 402 and two communication interfaces (e.g., UARTs) 314A, 314B. Each communication interface 314A, 314B comprises a power sharing interface 304A, 304B with controllable switching devices 306A, 306B, and a data interface 312A, 312B respectively. Power from power supply 402 is shared with other power supply modules in the group via either one or both of power sharing interfaces 304A, 304B. Power is shared via interface 304A while controllable switching device 306A is closed, and power is shared via interface 304B while controllable switching device 306B is closed.

Power supply module 500 is also coupled with other device modules such as communications and/or switching circuitry. For example, in an example embodiment, power supply modules 102, 104, 106, 108 in FIG. 1 may be embodied on switches, such as Ethernet switches. Thus, the power supply modules are providing power to powered ports (such as PoE or PoE+) and are also providing system power for switching operations.

Controller 316 advertises a minimum power requirement to inform the other members of the group and the group master about the power needed to keep the system running without the powered (e.g., POE) devices. For example, using the preceding switch example, the minimum power requirement would be the amount of power required to keep the switch running with providing power to the PoE devices. If power supply 500 is already operational and later joins a power sharing group, the minimum power requirement is the power needed to maintain steady state, for example:

> Minimum Power Requirement=Power needed to power up the system+total budgeted power(e.g., power given to the POE devices).

Power supply 402 may be employed as a backup or redundant power supply, or may be left off if power being provided (shared) from other power supply modules is sufficient to power all powered devices coupled with the group, including any powered devices coupled with at least one powered port 302. Therefore, if controller 316 obtains a power budget greater than or equal to the minimum power requirement, controller 316 switches on power supply 402; otherwise power supply 402 may be turned off.

In an example embodiment, controller 316 advertises a Maximum Power Requirement. The Maximum Power Requirement is advertised to inform the other members of the group and the group master about the maximum power needed to supply uninterrupted power to apparatus 500 and all the POE devices coupled with power supply module 500. In an example embodiment:

> Maximum Power Requirement=Minimum Power Requirement+(number of POE ports)*maximum power needed by a POE powered device(for example 30 watts("W")for PoE+ and 15.4 W for POE).

In an example embodiment, a first universal asynchronous receive/transmit (UART) is employed to implement communication interface 304A comprising the first power sharing interface 306A and first data interface 308A. A second UART is employed to implement second communication interface 304B comprising second power sharing interface 304B and second data interface 308B.

Figure 6:
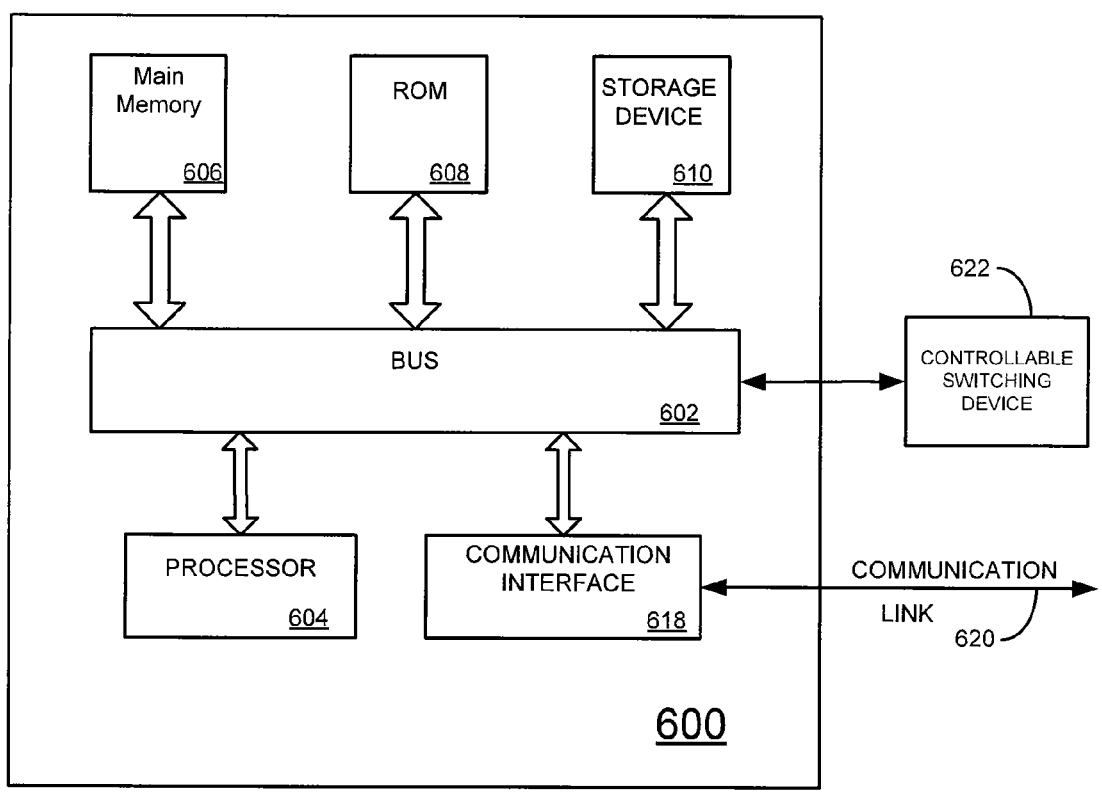
FIG. 6 is a block diagram illustrating an example of a computer system upon which an example embodiment can be implemented.

FIG. 6 is a block diagram that illustrates a computer system 600 upon which an example embodiment may be implemented. Computer system 600 may be employed to implement controller 316 (FIGS. 3-5).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

An aspect of the example embodiment is related to the use of computer system 600 for discovery and allocating power budgeting within a power sharing group. According to an example embodiment, discovery and allocating power budgeting within a power sharing group is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling computer system 600 to a communication link 620 that is coupled with at least one other power supply module. This allows processor 604 to communicate with other power supply modules, for example to send/receive discovery, power master declaration and/or power budget messages.

Computer system 600 is also coupled with controllable switching device 622 such as a CSDS and/or BCSDS. This allows the power supply module associated with computer system 600 to share power with at least one power supply module.

FIG. 7 illustrates an example message format 700 for exchanging data between power supply modules belonging to a power sharing group. The fields of example message format 700 will now be explained.

The major version field 702 is used to determine the compatibility of power sharing protocol running on the power supply modules connected together to form a power sharing group. In an example embodiment, power supply modules running different versions of major the version may not be allowed to form a power sharing group.

The minor version 704 is also used to determine the compatibility of power sharing protocol running on the power supply modules connected together. Different minor versions may not be a hindrance in forming a power sharing group. It should also be noted that the minor version can be used to elect the master. For example the switch with a larger minor version can be elected as a master.

The message type field 706 is used to differentiate between different message types. In an example embodiment, the following message types are defined for the power sharing protocol in accordance with an example embodiment:

Neighbor Discovery Message (0×1). This message is used during the power sharing group discovery and master election process.

Budget Assignment Message (0×2). This message is used by the master to assign power budget to individual switches. The master will also advertise its own power budget with this message.

Budgeted Power (0×3). This message is used only by the slave switches to advertise the power already allocated to its switch and the POE devices connected to it. Moreover, the budgeted power is different from the allocated power as allocated power is the budget assigned to a slave switch by the master.

Budget Request Message (0×4). This message is used by the slave switches to ask for more power budget from the master.

Priority Message (0×5). This message is used by switches in the group to advertise the priority assigned by the user to low priority POE, high priority POE and the switch itself. The first five bits of the payload message will indicate the system priority, the next five bits will be reserved for high priority POE and the next five bits will be reserved for low priority POE devices.

Configuration Change (0×6). This message is used by all the switches in the group to advertise the change in configuration. The change in configuration can be determined by looking at the flags in the $3^{rd}$ and $4^{th}$ bytes. The change in configuration is advertised when either a power supply is added or removed.

Invalid Configuration (0×7). This message is sent by the master to the neighbor of the switch that it wants to remove from the group. The neighbor of the switch with either an invalid configuration or being the 5$^{th}$ switch in the group would shut down the software communication bus of the UART interface connected to that switch.

Keep Alive Messages (0×8). This message will be sent out by members in the group to inform the other members in the group that the power supply module is alive.

The first power supply present ("PS1") field 708 is used to determine whether a power supply is present in a first slot of a power supply module. The second power supply present ("PS2") field 710 is used to determine whether a power supply is present in a second slot of a power supply module.

The stackable ("S") field 712 is used by power supply modules to advertise whether they can be made part of a power sharing group. The Jack-Jack ("J") field 714 is used to determine whether the switch is connected to an expandable power supply ("XPS" or "Jack-Jack") or another power stackable switch in a star topology. Jack-Jack field 714 is set by the Jack-Jack or the other device, not by the power supply module sending the message.

The Neighbor ("N") 716 field is used to determine the neighbors of a power supply module. The bit will be set by the power supply module before sending a discovery message. A power supply module upon receiving this message will reset this bit before forwarding it out another other UART interface. For example referring to FIG. 2 with continued reference to FIG. 7, if a message is received on communication interface 314A, the neighbor it will be reset before forwarding the message on communication interface 314B.

The Master ("M") field 718 is used to determine whether the power supply module sending the message is a master or a slave. Master field 718 is set by the master during the master declaration state.

Configuration ("C") field 720 is used to determine whether the power sharing group is operating in power sharing or redundant mode. If the field is set to (00b) then the group is in power sharing mode and if it is set to (01b) then it would be assumed that the group is in redundant mode. The default mode is the power sharing mode. Moreover, a user can set the switch to operate in standalone mode but in that case the switch will shut down both the software communication buses (for example interfaces 310A and 310B in FIG. 3).

End of the ring switch ("E") field 722 is used by a power supply module that is at the end of a half ring of a power sharing group. For example a power supply module that has only one UART interface connected to another switch.

Switch Removed ("R") field 724 is used by a neighbor of a switch that was removed from a group. The neighboring switch will set switch removal field 724 and send a discovery message out of its other UART interface. For example, referring to FIG. 2 with continued reference to FIG. 7, if a power supply module coupled to communication interface 314A (a UART in this example) is removed, controller 316 will send a discovery message with switch removal field 724 set via its second communication interface 314B (or a second UART in this example).

Reserved bits 726 are 1 bit flags that are unused in the example embodiment, but can be reserved for future use.

Length field 728 specifies the length of the packet. The sequence number field 730 is used to make sure that the power supply module is not getting duplicate messages. In an example embodiment, the power supply module sending a message or the master can remove a message from the ring. If the power supply module sending the message fails, the message may be continually forwarded on the ring. The sequence number field will prevent the remaining power supply modules on the ring from continually processing the messages.

The source MAC address field 732 will be populated by the power supply module sending out the packet with it own distinct MAC address. In an example embodiment, although a MAC address is 48 bits long, it can be condensed to a 40 bits long distinct MAC address.

The destination MAC address field 734 will be populated by the power supply module sending out the packet with a distinct MAC address of the intended recipient of the message. In an example embodiment, although the MAC address is 48 bits long, it can be condensed to a 40 bits long distinct MAC address.

The capacity of the first power supply (PS1 Power Supply) 736 is used to determine the type of the power supply in a first slot of a power supply module. The type of power supply will help the other switches determine the power capacity of the power supply.

The capacity of the second power supply (PS2 Power Supply) 738 is used to determine the type of the power supply in a second slot of a power supply module. The type of power supply will help the other switches determine the power capacity of the power supply.

The contents of Payload field 740 are dictated by the message type. Table 1 below describes the data that will populate the payload field based on the message type.

TABLE 1

Group Power Sharing Payload Description

| Message Type | Payload (1$^{st}$ byte) | Payload (2$^{nd}$ Byte) | |
|---|---|---|---|
| Discovery Message | Minimum Power Requirement | Maximum Power Requirement | |
| Budget Assignment Message | Power allocated by the master to an individual switch | | |
| Budgeted Power | Power budgeted to the POE devices connected to the switch. | | |
| Budget Request Message | Power increase request by individual switch to the master | | |
| Priority Message | Switch Priority | High Priority POE | Low Priority POE |
| Configuration Change | N/A | | |
| Invalid Configuration | N/A | | |
| Keep Alive Message | Power budgeted to the POE devices connected to the switch. | | |

In view of the foregoing structural and functional features described above, methodologies in accordance with an example embodiments will be better appreciated with reference to FIGS. 8 and 9. While, for purposes of simplicity of explanation, methodologies of FIGS. 8 and 9 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement an example embodiment.

Referring to FIG. 8, there is illustrated a methodology 800 for providing a power budget. In an example embodiment, a member of the power sharing group acts as the "Master" of the group and provides power budgeting and load shedding data to the other members of the group. For example, referring to FIG. 1, any one of power supplies modules 102, 104, 106, 108 may function as the master. The master may be configured as illustrated in either of FIG. 3, FIG. 4 or FIG. 5 (for example controller 316 in FIGS. 3-5 may perform the functionality described herein). In a star configuration, XPS 220 or any of power supply modules 202-216 may function as the master. In an example embodiment, processor 604 (FIG. 6) performs the functionality of methodology 800.

At 802, the master discovers members of a power sharing group. Members of the power sharing group send out discovery messages as described herein (see, e.g., FIG. 7) that are propagated to members of the group. In an example embodiment, a discovery message comprises a minimum power requirement and a maximum power requirement.

The Minimum Power requirement is advertised by individual power supplies to inform the other members of the group and the master about the power needed to keep the system running without the powered (e.g., POE) devices. Moreover, if a power supply module is already running in standalone mode and later joins a power sharing group, the minimum power requirement is the power needed to maintain steady state, that is, > Minimum power requirement=Power needed to power up the system+total budgeted power(i.e. power given to the POE devices).

The Maximum Power Requirement is advertised by individual modules to inform the other members of the group and group master about the maximum power needed to supply uninterrupted power to the system and all the powered (e.g., POE) devices.

> Maximum Power Requirement=Minimum Power Requirement+(number of POE ports)*maximum power needed by a POE device(30 for POE+ and 15.4 for POE).

At 804, upon discovery of all the members of the power sharing group, the group master collects information about all the power supplies in the power sharing group. For example, in the ring topology of FIG. 1, power supplies associated with power supply modules 102, 104, 106, 108. In the star configuration example of FIG. 2, the power supplies associated with power supply modules 202-216, and any power supplies available for sharing that are associated with expandable power supply 220.

At 806, the group master determines a power budget for individual members of the group. The power budget is based on power supply and load data supplied by individual members of the group.

Initially, if the power supplies are not part of the power sharing group, then the power budget given to the power supplies is the minimum power requirement of the device associated with that power supply (for example if a switch is coupled to the power supply module, the power requirement for operating the switching circuitry). Then after waiting for a predetermined time period (e.g., 2 minutes) so that other power supply modules in the group are given a chance to discover the other members of the power group, the following procedure can be employed to determine the power budget:

> Power sharing group global budget=Aggregate of total power supplies in the system(including the power supplies of expandable power supply 220 in a star configuration)

If the sum of maximum power requirements of member power supply modules is less than the power sharing group global power budget, the power budgets for the member power supply modules can be the maximum power budget of the member power supply modules. Otherwise, the maximum power requirement is reduced by a predetermined value (e.g., 50 Watts) and the new total power requirement of the power sharing group is calculated. If the new power requirement is less than the power sharing group global budget, the new power budget for individual power supply modules is known, otherwise the aforementioned process will continue unless the power budget of all the switches in the power sharing group is reached.

In an example embodiment, the power budget is calculated for the power sharing group to operate in a power sharing mode. In power sharing mode the total global power budget available to the master (to distribute to the member switches) is the cumulative capacity of all the front end power supply modules of the power sharing group (for example in FIG. 1 the cumulative capacity of power supply modules 102, 104, 106, 108).

In an example embodiment, the power budget is calculated for the power sharing group to operate in a redundant mode. In redundant mode, the individual switch power budget is calculated in the same way as it is done in power sharing mode but the global power budget is different. For example, the global power budget could be calculated by subtracting the power capacity of the largest power supply of the power sharing group from the sum of power of all the power supplies in the system. The redundant mode will tolerate a single (and in this example the largest) power supply failure and will make sure that the power sharing group continues to run in the same way as it was working before the power supply failure.

At 808, based on the information collected, the group master will distribute a power budget to individual members of the power sharing group. In an example embodiment, the group master sends unicast messages to members of the group with data representative of the member's power budget.

At 810, a determination is made whether there are any changes in power requirements. Examples of changes in power requirements may include but are not limited to removal of a power supply from the power sharing group, addition of a power supply to the power sharing group, a change in the load of a member of the power sharing group. If there are no changes to the power requirements (NO), then the master continues monitoring for changes. If, however, at 810, a change was observed, then 802-808 are repeated resulting in a new power budget being distributed to the power supply modules.

FIG. 9 illustrates an example of a methodology 900 for providing inputs into a load shedding algorithm. In an example embodiment, a member of the power sharing group acts as the "Master" of the group and provides power budgeting and load shedding data to the other members of the group. For example, referring to FIG. 1, any one of power supply modules 102, 104, 106, 108 may function as the master. The master may be configured as illustrated in any of FIGS. 3-5 (for example controller 316 in FIGS. 3-5 may perform the functionality described herein). In a star configuration, computing device 220 or any of power supply modules 202-216 may function as the master. In an example embodiment, a processor such as processor 604 (FIG. 6) performs the functionality of the master of the group.

In an example embodiment, the following load shedding events may be implemented: 1) Graceful load shedding, 2) immediate load shedding, 3) system ring load shedding, 4) system star load shedding, and 5) under voltage load shedding. In particular embodiments, there are three types of loads, low priority PoE ports, high priority PoE ports, and system loads, where a system load is the power required to keep a device providing power to powered devices (for example the power to maintain a switch that is providing PoE).

At 902, inputs for graceful load shedding are determined. Graceful load shedding occurs when a power supply is outputting more power than its rating, but within a predetermined threshold. For example, some power supplies may provide power up to twice their rating for a limited period of time. During graceful load shedding, a counter will be set to the lowest priority level and counts down to the highest priority level until the power supply is no longer outputting more than its rating (for example if there are 27 priority levels the counter starts at 27 and works towards 1).

Information about all of the power supply modules (such as capacity and load) belonging to a power sharing group is obtained. Different load levels are assigned to each load. In an example embodiment, the priority levels may be configured by a user, such as by entering data via a command line interface ("CLI"—not shown). In another embodiment, the priority levels are automatically assigned by the master of the group. For example, system loads (e.g. switches coupled with the power supply modules) may be assigned the highest priorities and sorted by MAC address (lowest to highest or visa versa), followed by powered devices which may also be prioritized based on MAC address.

At 904, the inputs for immediate load shedding are determined. To perform immediate load shedding, a determination is made for which loads to shed beforehand. In particular embodiments, the load is based on allocated power not actual power. In an example embodiment, all the power data for current power supplies and current load levels in the power sharing group are acquired. Loads are arranged in descending order. A calculation is made for a power supply module of how much power will be remaining if that supply is removed. If there is sufficient power left for all the current loads, then no immediate load shedding is needed. If the sum of the current loads is more than a predetermined threshold (e.g., twice the remaining power) then need immediate load shedding occurs. Loads are subtracted from the sorted list until the remaining loads to do not exceed the capacity of the remaining power supply modules. In an example embodiment, the loads to be shed are set in the hardware for that power supply module (e.g., the data may be stored in a hardware register). Since loads can be on different power supply modules, power supply modules (for example controller 316) in the power sharing group performs the calculations and sets the hardware for its local loads (e.g., loads associated with at least one powered port 302). Whenever a change in input power, current load, etc., is detected, the immediate load shedding configuration is recalculated.

At 908, the inputs for System Ring and/or System Star load shedding are determined. System ring and System star load shedding apply to when a system is removed from the power sharing group. In this scenario, more than one power supply may be lost. The calculations are similar to immediate load shedding, but the scenarios are different. Loads are maintained in descending order; however, calculations are made based on the topology (e.g., Ring or Star) of the power sharing group.

In an example embodiment, a table is generated comprising the neighbors of a power supply module. Calculations are made as to how much power would be left (and which loads should be shed) if a neighboring power supply module is removed (for example, from discovery messages described in FIG. 7 supra, the capacity of power supplies in a power supply module can be obtained). Settings may be updated and recalculated based on any topology changes, power supply changes, and load changes. An individual power supply module will perform its own calculations to determine its settings.

At 912, a determination is made whether under voltage load shedding should be performed. Under voltage can occur when there is a power supply failure while in an invalid power sharing group configuration. Upon detecting an invalid configuration (YES), under voltage load shedding is enabled, as illustrated at 912. Graceful or immediate load shedding may be performed for under voltage load shedding. Under voltage load shedding will be disabled upon detecting a valid configuration, and processing returns to 910.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   an interface for communicating with at least one other power supply module;
   a controller coupled with the interface;
   wherein the controller is operable to determine members of a power sharing group through messages received from the interface;
   wherein the controller collects data representative of input power and load power for members of the power sharing group;
   wherein the controller determines a power budget for members of the power sharing group based on the data representative of input power and load power for members of the power sharing group;
   wherein the controller distributes the power budget to members of the power sharing group via the interface;
   wherein the controller determines a remaining capacity if a neighboring power supply module no longer shares power;
   wherein the controller determines in accordance with the remaining capacity a first set of loads to immediately shed if the neighboring power supply module no longer shares power;
   wherein the controller stores immediate load shedding data in a hardware register, the immediate load shedding data being representative of the first set of loads to immediately shed if the neighboring power supply module no longer shares power; and,
   wherein the controller selectively immediately sheds the first set of loads responsive to the neighboring power supply module no longer sharing power and in accordance with the immediate load shedding data stored in the hardware register.

2. The apparatus set forth in claim 1, wherein the data representative of load comprises a minimum power requirement and a maximum power requirement.

3. The apparatus set forth in claim 1, wherein the controller determines a power budget for a power sharing mode.

4. The apparatus set forth in claim 1, wherein the controller determines a power budget for a redundant mode.

5. The apparatus set forth in claim 1, wherein the controller determines whether there has been a change in one of a group consisting of capacity and load;
   wherein the controller calculates a new power supply budget for members of the power sharing group responsive to detecting the change in one of the group consisting of capacity and load; and
   wherein the controller distributes the new power supply budget to member of the power sharing group.

6. The apparatus set forth in claim 1, wherein the controller determines a priority level for loads; and wherein the controller sorts the loads by priority level to enable graceful power shedding.

7. The apparatus set forth in claim 1, wherein the controller arranges loads in descending order;
wherein the controller determines an amount of power remaining if a power supply module is removed; and
wherein the controller determines which loads should be shed if the power supply is removed from the power sharing group.

8. The apparatus set forth in claim 1, wherein the controller determines the remaining capacity in accordance with a selected threshold relative to a remaining power if a neighboring power supply module no longer shares power.

9. The apparatus set forth in claim 1, wherein the controller performs under voltage load shedding responsive to determining a power supply failure and an invalid power sharing group configuration.

10. The apparatus set forth in claim 9, wherein the controller disables under voltage load shedding responsive to detecting a valid configuration.

11. A method, comprising:
determining members of a power sharing group;
obtaining data representative of input power and load power for members of the power sharing group;
determining, by a controller, a power budget for members of the power sharing group based on the data representative of input power and load power;
distributing the power budget to members of the power sharing group;
determining a remaining capacity if a neighboring power supply module no longer shares power;
determining in accordance with the remaining capacity a first set of loads to immediately shed if the neighboring power supply module no longer shares power;
storing immediate load shedding data in a hardware register, the immediate load shedding data being representative of the first set of loads to immediately shed if the neighboring power supply module no longer shares power; and,
selectively immediately shedding the first set of loads responsive to the neighboring power supply module no longer sharing power and in accordance with the immediate load shedding data stored in the hardware register.

12. The method set forth in claim 11, further comprising:
determining a load level for loads being powered by members of the power sharing group; and
sorting the loads by priority loading in descending order to enable graceful power shedding.

13. The method set forth in claim 11, further comprising:
sorting loads by power level in descending order;
determining an amount of power remaining if a power supply module is removed; and,
determining which loads to remove in sorted order if the power supply module is removed.

14. The method set forth in claim 11, further comprising determining a topology; and,
determining remaining capacity and which loads to shed based topology changes if a neighboring power supply module is no longer sharing power.

15. The method set forth in claim 11, further comprising:
determining a power supply failure;
determining an invalid power sharing group configuration; and
performing under voltage load shedding responsive to determining the power supply failure and the invalid power sharing group configuration.

16. Logic encoded in a non-transitory computer readable storage medium for execution by a processor, and when executed operable to:
determine members of a power sharing group;
obtain data representative of input power and load power for members of the power sharing group;
determine a power budget for members of the power sharing group based on the data representative of input power and load power for members of the power sharing group;
distribute the power budget to members of the power sharing group;
determine a remaining capacity if a neighboring power supply module no longer shares power;
determine in accordance with the remaining capacity a first set of loads to immediately shed if the neighboring power supply module no longer shares power;
store immediate load shedding data in a hardware register, the immediate load shedding data being representative of the first set of loads to immediately shed if the neighboring power supply module no longer shares power; and,
selectively immediately shed the first set of loads responsive to the neighboring power supply module no longer sharing power and in accordance with the immediate load shedding data stored in the hardware register.

17. The logic set forth in claim 16, wherein the data representative of load power comprises a minimum power requirement and a maximum power requirement.

18. The logic set forth in claim 16, wherein the power budget is for a power sharing mode.

19. The logic set forth in claim 16, wherein the power budget is for a redundant mode.

20. The logic set forth in claim 16, further operable to:
determine whether there has been a change in one of a group consisting of power supply capacity and load;
calculate a new power supply budget for members of the power sharing group responsive to detecting the change in one of the group consisting of power supply capacity and load; and
distribute the new power supply budget to members of the power sharing group.

* * * * *

UNITED STATES PATENT AND TRADEMARK OFFICE
CERTIFICATE OF CORRECTION

PATENT NO.        : 8,676,393 B1
APPLICATION NO.   : 13/048475
DATED             : March 18, 2014
INVENTOR(S)       : John R. Hupton et al.

It is certified that error appears in the above-identified patent and that said Letters Patent is hereby corrected as shown below:

In the Specification:

column 13, line 17, "visa" should read "vice".

column 13, line 64, "912" should read "910".

In the Claims:

In claim 14, column 16, line 4, between the words "based" and "topology", insert -- "on" --.

Signed and Sealed this
Fifth Day of August, 2014

Michelle K. Lee
*Deputy Director of the United States Patent and Trademark Office*